United States Patent Office 3,510,490
Patented May 5, 1970

3,510,490
3,4-DIHYDRO-1-(2-HYDROXYALKYLAMINO)-4,4-TRIALKYL-2-(1H)-PYRIMIDINETHIONES
John Joseph D'Amico, Dunbar, W. Va., assignor to Monsanto Company, St. Louis, Mo., a corporation of Delaware
No Drawing. Filed Dec. 18, 1967, Ser. No. 691,181
Int. Cl. C07d *51/28, 51/34*
U.S. Cl. 260—256.5    2 Claims

ABSTRACT OF THE DISCLOSURE

The compound 3,4-dihydro-1-(2-hydroxyethylamino)-4,4,6-trimethyl-2(1H)-pyrimidinethione of the formula

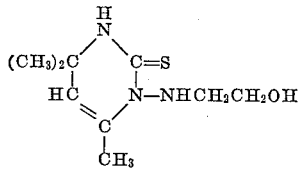

is useful as an accelerator for the vulcanization of rubber and as a chemosterilant against screw-worm flies.

Background of the invention

The field of art of the invention is new chemical compounds useful as rubber vulcanization accelerators and as chemosterilants.

Roger A. Mathes and Floyd D. Stewart in U.S. Pat. 2,535,858 of Dec. 26, 1950, assigned to The B. F. Goodrich Company teach the preparation of 2-mercapto-3-amino-3,6-dihydro-pyrimidines from simple hydrazines.

Summary of the invention

The invention is the compounds 3,4-dihydro-1-(2-hydroxyalkylamino) - 4,4,6 - trialkyl - 2(1H) - pyrimidinethiones of the formula

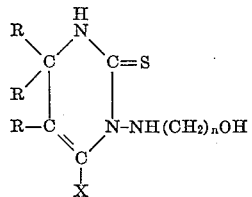

where the R's are hydrogen or alkylhydrocarbons of 1 to 5 carbon atoms, X is an alkylhydrocarbon of 1 to 5 carbon atoms, and $n$ is an integer from 2 to 6.

Description of the preferred embodiment

The compound 3,4-dihydro-1-(2-hydroxyethylamino)-4,4,6-trimethyl-2(1H)-pyrimidinethione is formed according to the following reaction:

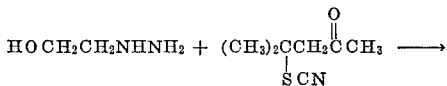

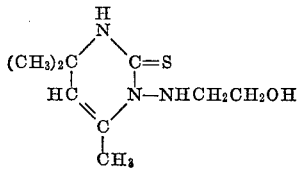

To prepare the compound, a mixture of 38.1 grams (0.50 mole) beta-hydroxyethyl hydrazine, 100 ml. of water, and 3 grams of concentrated sulfuric acid is stirred in a 500 ml. Erlenmeyer flask equipped with a stirrer and a condenser. To the stirred mixture, 78 grams of freshly distilled 1,1-dimethyl-3-oxobutyl-thiocyanic acid is added in one portion. An exothermic reaction takes place showing a temperature rise of 25° to 68° C. The reaction mixture is stirred and heated at reflux for 3 hours and then cooled to 5° C. Two-hundred ml. of cold water is added and the mixture is stirred at 0° to 10° C. for 15 minutes. The precipitate is collected by filtration and washed with 300 ml. of water. The product is air dried at 25° to 30° C. Thirty-four grams of product, a 31.6% yield, is obtained which melts at 167°–172° C. A sample of the 3,4-dihydro-1 - (2 - hydroxyethylamino) - 4,4,6 - trimethyl-2(1H)-pyrimidinethione recrystallized from ethyl alcohol shows a melting point of 185°–187° C. Analysis of the product shows 14.84% sulfur and 19.66% nitrogen. The calculated percentages for $C_9H_{17}N_3OS$ are 14.89% sulfur and 19.52% nitrogen. The analysis precludes the possibility of ring closure with splitting out of water. Other compounds of this invention are prepared in a similar manner with comparable results.

The compounds of this invention are accelerators for the vulcanization of rubber which is shown by the data below. The compound 3,4-dihydro-1-(2-hydroxyethylamino)-4,4,6-trimethyl-2(1H)-pyrimidinethione is tested in natural rubber masterbatch composed of the following:

|   | Parts |
|---|---|
| Natural rubber smoked sheets | 100.0 |
| Carbon black (high abrasion) | 50.0 |
| Zinc oxide | 5.0 |
| Stearic acid | 3.0 |
| Hydrocarbon softener | 3.0 |
| Antioxidant N-phenyl-beta-naphthylamine | 1.0 |
| Sulfur | 2.5 |

The data illustrate the accelerator properties by Mooney Scorch Tests and Stress-Strain Tests for 3,4-dihydro-1-(2-hydroxyethylamino) - 4,4,6 - trimethyl-2(1H)-pyrimidinethione compared to the commercial accelerator 2-mercaptobenzothiazole. The Mooney Scorch Test has the American Society for Testing and Materials (ASTM) Designation D–1646–63, and the test is described under the title "Viscosity and Curing Characteristics of Rubber by the Shearing Disk Viscometer" in Part 28, 1967 Book of ASTM Standards, published by the American Society for Testing and Materials, pages 811–817. The Stress-Strain Test has the American Society for Testing and Materials Designation D–412–66 and the test is described under the title "Standard Method of Tension Testing of Vulcanized Rubber" in Part 28, 1967 Book of ASTM Standards, supra, pages 200–211.

MOONEY SCORCH DATA AT 135 °C.

|   | Minimum reading | Minutes to 10 point rise | Δ 35–10 |
|---|---|---|---|
| 3,4-dihydro-1-(2-hydroxyethylamino)-4,4,6-trimethyl-2(1H)-pyrimidinethione | 28.5 | 8.2 | 4.0 |
| 2-mercaptobenzothiazole | 29.5 | 5.7 | 1.1 |

STRESS-STRAIN DATA

|  | Cure time at 144° C. | Modulus at 300% elongation (lbs./in.²) | Ultimate tensile strength (lbs./in.²) | Ultimate elongation, percent |
| --- | --- | --- | --- | --- |
| 3,4-dihydro-1-(2-hydroxy-ethylamino)-4,4,6-trimethyl-2(1H)-pyrimidine-thione | 45 | 1,000 | 2,330 | 490 |
|  | 60 | 1,200 | 2,140 | 430 |
| 2-mercaptobenzothiazole | 45 | 1,740 | 3,630 | 520 |
|  | 60 | 1,780 | 3,310 | 470 |

Data comparable to the data above is obtained with the other compounds of this invention.

The compounds of this invention are also chemosterilants. When 3,4-dihydro-1-(2-hydroxyethylamino)-4,4,6-trimethyl-2(1H)-pyrimidinethione is fed to adult screwworm flies at a concentration of 1%, the subsequent eggs are completely infertile.

It is intended to cover all changes and modifications of the examples of the invention herein chosen for purposes of disclosure which do not constitute departure from the spirit and scope of the invention.

I claim:

1. A compound having the formula

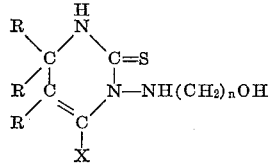

wherein the R's are hydrogen or alkylhydrocarbon of 1 to 5 carbon atoms, X is an alkylhydrocarbon of 1 to 5 carbon atoms and $n$ is an integer from 2 to 6.

2. The compound 3,4 - dihydro - 1 - (2 - hydroxyethylamino) - 4,4,6 - trimethyl-2(1H)-pyrimidinethione of the formula

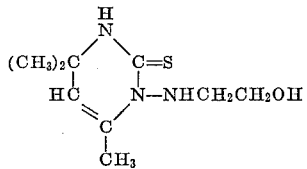

References Cited

UNITED STATES PATENTS 2,535,858   12/1950   Mathes et al.
3,257,419   6/1966   D'Amico et al.
3,329,519   7/1967   Mills.

ALEX MAZEL, Primary Examiner

R. J. GALLAGHER, Assistant Examiner

U.S. Cl. X.R.

260—791; 424—251